United States Patent [19]

Brandt

[11] Patent Number: 4,563,767

[45] Date of Patent: Jan. 7, 1986

[54] METHOD OF PHASE-SYNCHRONIZING A TRANSIT EXCHANGE IN A DIGITAL TELECOMMUNICATION NETWORK

[75] Inventor: Harald E. Brandt, Döbelnsgatan, Sweden

[73] Assignee: Telefonaktiebolaget LM Ericsson, Stockholm, Sweden

[21] Appl. No.: 556,242

[22] PCT Filed: Mar. 1, 1983

[86] PCT No.: PCT/SE83/00068
§ 371 Date: Nov. 8, 1983
§ 102(e) Date: Nov. 8, 1983

[87] PCT Pub. No.: WO83/03175
PCT Pub. Date: Sep. 15, 1983

[30] Foreign Application Priority Data

Mar. 10, 1982 [SE] Sweden ............................. 8201494

[51] Int. Cl.[4] ............................................. H04J 3/06
[52] U.S. Cl. ................................... 375/107; 375/108; 375/120; 331/11
[58] Field of Search ............... 375/107, 118, 106, 108, 375/119, 120; 370/103; 455/51; 331/10, 11, 12; 328/55

[56] References Cited

U.S. PATENT DOCUMENTS

| 3,555,194 | 1/1971 | Goto | 370/103 |
| 3,597,552 | 8/1971 | Goto | 370/100 |
| 3,862,365 | 1/1975 | Kobayashi et al. | 455/51 |
| 4,075,248 | 2/1978 | Ghisler et al. | 370/103 |
| 4,339,817 | 7/1982 | Hata et al. | 375/107 |

Primary Examiner—Robert L. Griffin
Assistant Examiner—Raymond C. Glenny
Attorney, Agent, or Firm—Roberts, Spiecens & Cohen

[57] ABSTRACT

Method and apparatus for synchronizing the phase of a transit exchange in a digital communication network. The transit exchange has a signal-controlled oscillator with an output signal which depends on the collectively weighted phase difference between the local exchange clock and the clock of the other exchanges. To avoid phase jumps, a signal corresponding to the phase difference is sampled, the sampled values differentiated, the differentiated values compared with a limit value employing a phase jump when exceeded, and when this value is exceeded a signal with the control signal's highest value but with opposite sign is added to form a compensation signal, this compensation signal being added to the differentiated value, and after possible weighting the differentiated value is summed with corresponding differentiated values from comparison with the phases of other links, and the sum value integrated to obtain a resulting control signal.

4 Claims, 5 Drawing Figures

METHOD OF PHASE-SYNCHRONIZING A TRANSIT EXCHANGE IN A DIGITAL TELECOMMUNICATION NETWORK

FIELD OF INVENTION

The invention relates to a method of and apparatus for phase-synchronising a transit exchange in a digital telecommunication network, including a signal-controlled oscillator, the control signal of which is influenced by the collectively weighted phase difference between the local transit exchange clock and that of the other exchanges.

BACKGROUND

A synchronisation of the type mentioned involves each station in the network forming its frequency as a mean value of the frequencies of the incoming links. This is done by measuring the phase differences between incoming link clock signals and the local clock, subsequent to which the phase positions are added or weighted together to provide a control value acting on the clock in the respective exchange via a regulator. The phase detector may be analog or digital, although only a digital phase detector is suitable for use in a time multiplex system.

A phase detector represents a periodic function, i.e. the variation of the faulty signal between zero and the highest deviation corresponding to the phase difference $2\pi$ is repeated for each $2\pi$ phase difference. This means that large phase jumps occur just when the phase position exceeds or falls below its measuring range. Even if the sum of the phase positions is kept constant in a network, the individual phase positions can move apart and cause phase jumps. This can result in difficulties when the clock frequency rapidly changes, thus possibly causing new phase jumps. Since the entire network is synchronised, such a phase jump can cause the whole network to hunt.

SUMMARY OF INVENTION

An object of the invention is to eliminate this drawback and to provide a method by which phase jumps in the phase detection are avoided. This is accomplished in that the change of phase difference in respect of each of the clock signals of the incoming links is monitored, and if this change exceeds a given limit indicating that a phase jump has taken place, the signal is corrected before it is used for regulation of the oscillator.

More particularly to achieve the above and other objects of the invention, there is provided a method of synchronizing the phase of clocks from links from different stations in a transit exchange in a digital telecommunication network including a signal controlled oscillator, the output of which is dependent on collectively weighted phase differences between a local exchange clock and the clocks of the other stations, the method being characterized in that for avoiding a phase jump a signal corresponding to the phase difference is sampled for each of the incoming links thereby producing sampled values. These sampled values are differentiated thereby producing differentiated values. The differentiated values are compared with a limiting value for indicating a phase jump when the limiting value is exceeded. When the limiting value is exceeded, a compensation signal having a control signal's highest value but with opposite sign is added to the differentiated value to form a compensated differentiated value. After possible weighting, the compensated differentiated value is added to the compensated differentiated values corresponding to the other links producing a sum value and the sum value is integrated for obtaining the control signal.

In further accordance with the invention apparatus is provided for synchronizing the phase of clocks from links from different stations in a transit exchange in a digital communication network including a signal controlled oscillator, the output of which is dependent on collectively weighted phase differences between a local exchange clock and the clocks of the other stations. The apparatus includes in accordance with a preferred embodiment phase detectors for sensing the phase difference between the local exchange clock from the signal controlled oscillator and the clocks of each of the incoming links for generating a signal proportional to the phase difference. Differentiating circuits are provided for differentiating the phase difference-proportional signal, thereby producing a differentiated signal. Compensation means are provided for adding to the differentiated signal in response to the differentiated signal exceeding a given value, a compensation signal with opposite sign and corresponding to the greatest value of a control signal to form a compensated differentiated signal. A summing circuit is provided for adding after possible weighting the compensated differentiated signal to the compensated differentiated signals from other links thereby forming a summing result. An integration circuit is provided for intergrating the summing result to obtain the control signal.

Other objects, feature and advantages of the invention will be found in the Detailed Description which follows hereinafter as illustrated in the accompanying drawing.

BRIEF DESCRIPTION OF THE DRAWING

The invention will next be described in detail below with reference an embodiment, as shown in the appended drawing, wherein FIG. 1 schematically illustrates a telecommunication network in which the invention is applied.

DETAILED DESCRIPTION OF THE INVENTION

Figure 1:
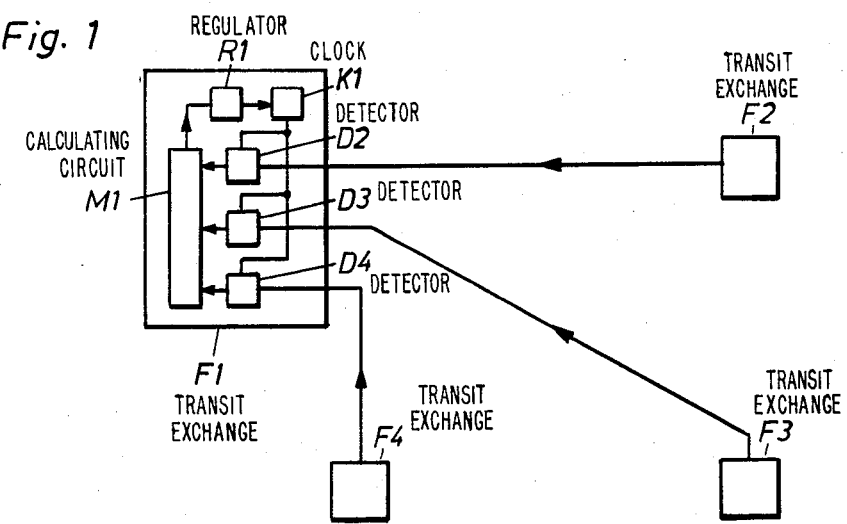

FIG. 1 schematically illustrates a telecommunication network including transit exchanges F1–F4 in connection with each other, via, for example, 32 communication channels. The rate of one of these is used to transmit clock signals between the exchanges. To provide synchronisation between the exchanges, the phase of the internal clock, for example, in the station F1, is in accordance with the average value of the phase difference in respect of each of the incoming channels from stations F2–F4. The phase of the incoming clock signals is compared in detectors D2–D4 with the phase of the internal clock K1. The signal from the detectors actuates a calculating circuit M1 which in correspondence with the mean or collectively weighted deviation generates a control signal. This control signal is supplied to the voltage-controlled oscillator to increase or decrease the frequency through regulator R1 which may consist of a discrete time filter.

Figure 2:
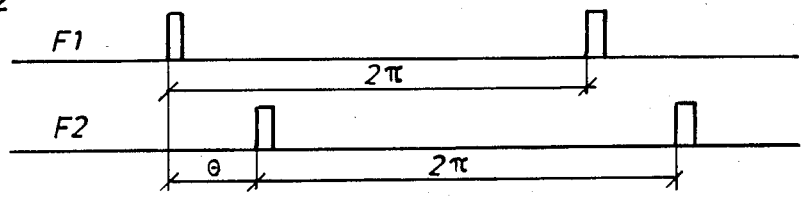
FIG. 2 is a time diagram illustrating the clock pulses of an incoming channel and of the local exchange clock.
Figure 3:
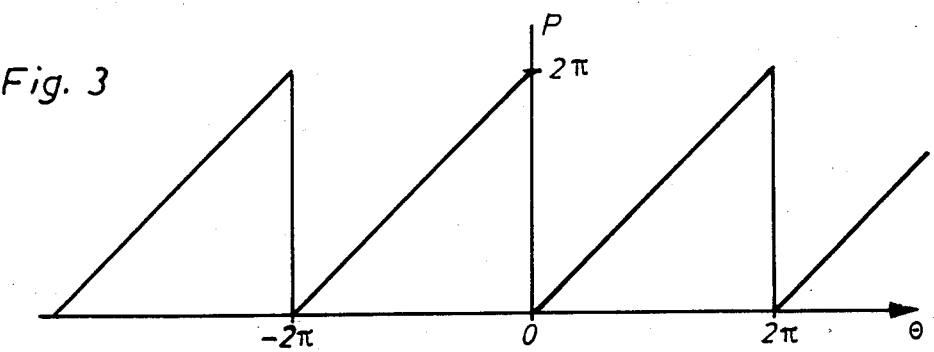
FIG. 3 illustrates the output signal of a phase detector as a function of the phase difference of the signals fed to the phase detector.

FIG. 2 illustrates the time cycle of the local exchange clock signals and of the incoming clock signals. The phase difference $\theta$ is measured by the respective phase detector D2–D4, the output signal characteristic of which is illustrated in FIG. 3. As it will be seen, the characteristic is periodic and has a 0 value at the beginning and a maximum value at the end of each phase difference of $2\pi$ magnitude. With the aid of FIG. 3, it is easy to understand that a large phase jump occurs just when the phase position falls below or exceeds a measuring range. The problem is the same in a network, as even if the sum of the phase positions is kept constant, the individual phase positions may move apart and cause phase jumps. Such phase jumps result in serious disturbances, since the frequency of the clock is rapidly changed and new phase jumps can thereby occur. Since the network is synchronised, such a phase jump can cause hunting in the entire network.

Let it be assumed that an exchange is controlled by three links. At the time t, the phase difference in respect of the first of the links is $2\pi$ and in respect of the other two $-\pi$, giving a sum equal to zero. If the phase positions at the time $t+1$ are 0 for the first link and $-\pi$ for the other two, as before, the sum will be $-2\pi$, resulting in a phase jump in spite of the actual phase change being small. As previously mentioned such a phase jump may cause hunting in the entire network.

In accordance with the inventive concept, the effect of the phase jump is eliminated by making a correction for such measured values, the difference of which in relation to a preceding value exceeds a given limit as a result of a phase jump having taken place. This is effected in that neither the phase differences nor their sum are to control the oscillator frequency but the phase increments are calculated at each of the sampling moments, and those indicating a phase jump are corrected. The phase increments from all the links are summed and this sum is integrated with respect to time, a value being obtained which is equal to the sum of the fictive phase positions of the links. This sum will not have any phase jumps and the system is free from transients caused by diverging phase positions.

Figure 4:
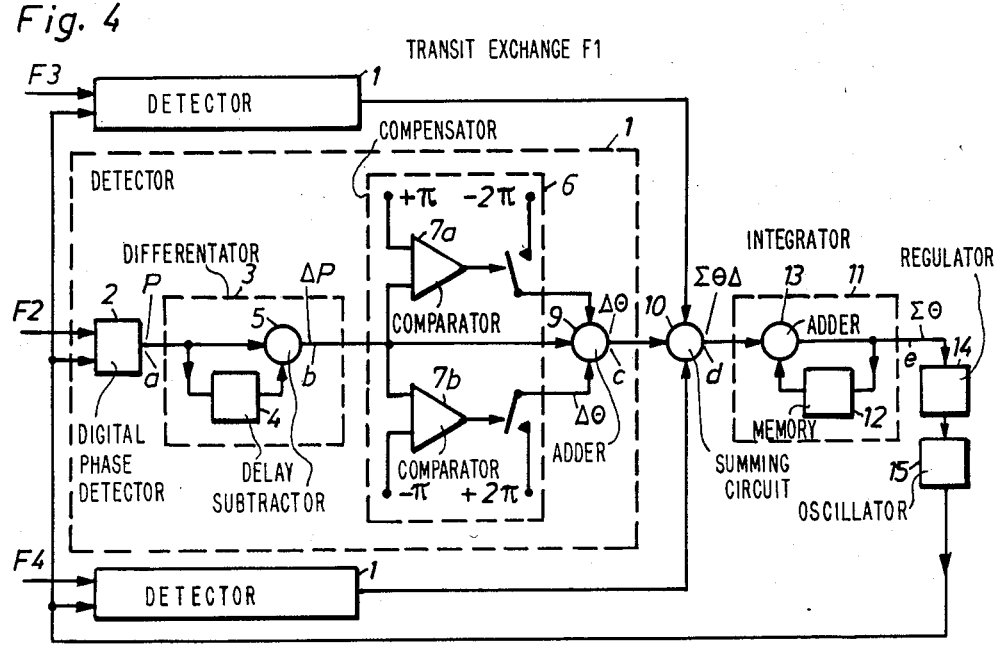
FIG. 4 is a block diagram of an apparatus operating in accordance with the inventive principle.
Figure 5:
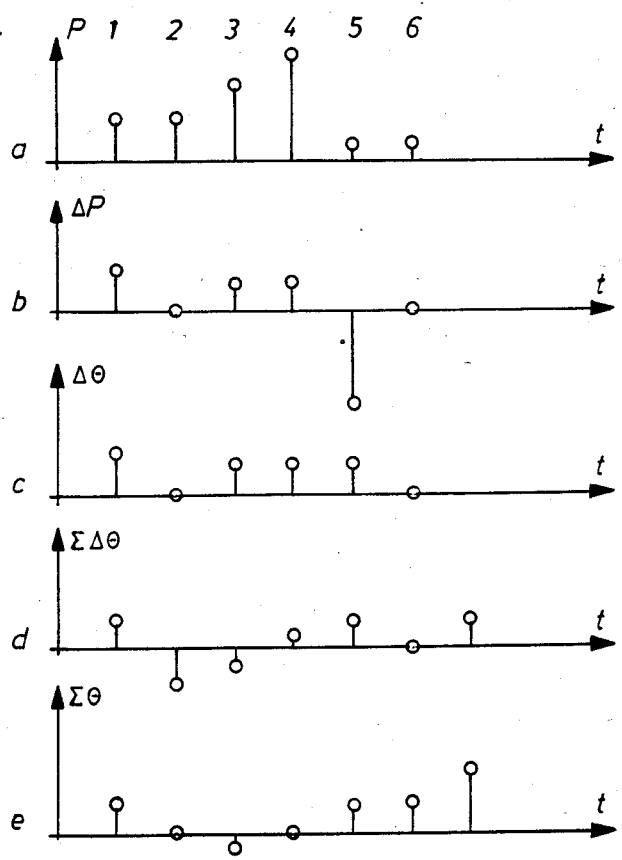
FIGS. 5a–e are diagrams illustrating signal values at different points in the circuit according to FIG. 4 for various monitoring times.

FIG. 4 illustrates an apparatus operating in accordance with the principle mentioned. For cooperation with each of the incoming links there is arranged a detection apparatus 1 of which only what is associated with the link coming from station F2 is shown in detail. A digital phase detector 2 compares the clock signal coming from the link, with the local exhcange clock signal, and generates a control signal P proportional to the phase difference. This signal is processed in a differentiation circuit 3, which includes a delay circuit 4 and a subtraction circuit 5, and executes a subtraction between two measured values obtained from the digital phase detector at two subsequent samplings. The signals obtained from the phase detector are shown in the diagram 5a and the differentiated signals in the diagram 5b at a number of samplings. The differentiated signals P are fed to a compensating circuit 6 comprising two comparators 7a and 7b, for comparing the differentiated signal with a positive and a negative threshold value, respectively, corresponding to half of the greatest indication by the phase detector in the example. Should the value of the differentiated signal exceed the positive or negative reference value, the output signal of the respective comparator closes a contact 8a, 8b connecting a compensation voltage to an addition circuit 9 to which also the differentiated signal is fed directly, such compensation voltage corresponding to the greatest indication by the phase detector, but having opposite sign relative to the respective comparator reference voltage. According to the example, the value of the reference signal is the voltage corresponding to $+\pi$ and $-\pi$ phase difference, whereas the value of the compensation voltage corresponds to $+2\pi$ and $-2\pi$ phase difference. The values indicated in FIG. 5c are obtained from the adding circuit 9. The value of the signal obtained from the sampling point 5 in FIG. 5b, the value and sign change of which signal indicates that a phase jump has taken place, has been changed from what FIG. 5c shows so that the values no longer have any discontinuity. The signals from each detecting apparatus 1 are fed to a summing circuit 10 and the sum signal (FIG. 5d) is fed therefrom to an integration circuit 11 comprising a memory 12 and an adding circuit 13, which adds each signal to the preceding signal. The resulting signal (FIG. 5e) is subsequently utilized for controlling the frequency of oscillator 15 via a regulator 14, which may consist of a discrete time filter. It is obvious that there is no danger of the network starting to hunt due to phase jumps, since by the differentiation, signal compensation and integration the results of the phase jump have been eliminated. In the example, detection of the phase differences is performed at time intervals of 0.25 s.

The invention is not limited to the described embodiment. For example, it is quite possible that the differentiated phase signal, which exceeds a given threshold value and is converted in a compensation circuit corresponding to the circuit 6, is summed with similar signals coming from other links and the sum integrated. This sum signal is then added to the sum of the original phase detection signals from all the links. It should be obvious that such a solution is also within the scope of the invention, as well as the application in a master-slave network where each exchange can sense the phase difference in respect of several exchanges but is only affected by the nearest superordinated station.

What is claimed is:

1. Method of synchronizing the phase of clocks from links from different stations in a transit exchange in a digital telecommunication network, including a signal-controlled oscillator, the output of which is dependent on collectively weighted phase differences between a local exchange clock and the clocks of the other stations, characterized in that for avoiding a phase jump the following steps are carried out:

a signal corresponding to the phase difference is sampled for each of the incoming links, producing sampled values;

the sampled values are differentiated, producing differentiated values;

the differentiated values are compared with a limiting value for indicating a phase jump when said limiting value is exceeded;

when this limiting value is exceeded, a compensation signal having a control signal's highest value but with opposite sign is added to the differentiated value to form a compensated differentiated value;

after possible weighting, the compensated differentiated value is added to the compensated differentiated values corresponding to other links, producing a sum value; and the sum value is integrated for obtaining the control signal.

2. Apparatus for synchronizing the phase of clocks from links from different stations in a transit exchange in a digital telecommunication network, including a signal-controlled oscillator (K1) the output of which is dependent on collectively-weighted phase differences between a local exchange clock and the clocks of the other stations as claimed in claim 1, characterized in that the apparatus includes:

phase detectors (2) for sensing the phase difference between the local exchange clock from the signal-controlled oscillator and the clocks of each of the incoming links for generating a signal proportional to the phase difference;

differentiation circuits (3) for differentiating said phase difference-proportional signal, producing a differentiated signal;

compensation means (6) for adding to the differentiated signal, in response to the differentiated signal exceeding a given value, a compensation signal with opposite sign and corresponding to the greatest value of a control signal to form a compensated differentiated signal;

a summing circuit (10) for adding, after possible weighting, the compensated differentiated signal to the compensated differentiated signals from other links, forming a summing result; and integration means (1) for integrating the summing result to obtain the control signal.

3. Method of synchronizing the phase of clocks from a link from a different station in a transit exchange in a digital telecommunication network, including a signal-controlled oscillator, the output of which is dependent on phase differences between a local exchange clock and the clock of the other station, characterized in that for avoiding a phase jump the following steps are carried out:

a signal corresponding to the phase difference is sampled for the incoming link, producing sampled values;

the sampled values are differentiated, producing differentiated values;

the differentiated values are compared with a limiting value for indicating a phase jump when said limiting value is exceeded;

when this limiting value is exceeded, a compensation signal having a control signal's highest value but with opposite sign is added to the differentiated value to form a compensated differentiated value;

the compensated differentiated value is processed for obtaining the control signal.

4. The method of claim 3 wherein said processing is an integration step.

* * * * *